US012777283B2

(12) United States Patent
Pan et al.

(10) Patent No.: US 12,777,283 B2
(45) Date of Patent: Oct. 27, 2026

(54) AUDIO SHARING METHOD, USER DEVICE AND AUDIO PLAYING DEVICE

(71) Applicant: SAMSUNG ELECTRONICS CO., LTD., Suwon-si (KR)

(72) Inventors: Xin Pan, Xi'An (CN); Dong Xu, Xi'An (CN); Shaoying Zhao, Xi'An (CN); Yajun Zhi, Xi'An (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 293 days.

(21) Appl. No.: 18/516,205

(22) Filed: Nov. 21, 2023

(65) Prior Publication Data

US 2025/0056158 A1 Feb. 13, 2025

(30) Foreign Application Priority Data

Aug. 10, 2023 (CN) ......................... 202311007002.9

(51) Int. Cl.
*H04R 3/12* (2006.01)
*G06F 3/16* (2006.01)
*H04R 1/10* (2006.01)

(52) U.S. Cl.
CPC ............... *H04R 3/12* (2013.01); *G06F 3/165* (2013.01); *H04R 1/1041* (2013.01); *H04R 2420/07* (2013.01)

(58) Field of Classification Search
CPC .... H04R 1/1041; H04R 3/12; H04R 2420/07; G06F 3/165
See application file for complete search history.

(56) References Cited

U.S. PATENT DOCUMENTS

| | | | | |
|---|---|---|---|---|
| 8,442,428 | B2 | 5/2013 | Tan et al. | |
| 2009/0017868 | A1 | 1/2009 | Ueda et al. | |
| 2022/0053270 | A1 | 2/2022 | Ko et al. | |
| 2022/0070247 | A1* | 3/2022 | Wang | G06F 3/165 |
| 2022/0174392 | A1 | 6/2022 | Jorgovanovic et al. | |
| 2022/0191953 | A1 | 6/2022 | Paycher | |
| 2022/0232333 | A1 | 7/2022 | Hariharan et al. | |
| 2023/0217195 | A1* | 7/2023 | Poltorak | G06F 3/165 381/315 |
| 2024/0224000 | A1* | 7/2024 | Kamhi | H04W 4/06 |

FOREIGN PATENT DOCUMENTS

EP 3883259 A1 9/2021

* cited by examiner

*Primary Examiner* — Paul W Huber
(74) *Attorney, Agent, or Firm* — Sughrue Mion, PLLC

(57) ABSTRACT

The present disclosure provides methods, apparatuses, and computer-readable mediums for audio sharing. In some embodiments, a method of audio sharing method to be performed by a first user device includes advertising an audio sharing message including a predetermined set identification, based on an indication from a user to share an audio content. The method further includes receiving, from a second audio playing device, an audio sharing confirmation message indicating that the second audio playing device has switched from an original set identification to the predetermined set identification. The method further includes establishing a third short-range wireless connection with the second audio playing device. The method further includes sending an audio data packet of the audio content to the first audio playing device, using the first short-range wireless connection, and the second audio playing device, using the third short-range wireless connection.

20 Claims, 12 Drawing Sheets

AUDIO SHARING METHOD, USER DEVICE AND AUDIO PLAYING DEVICE

CROSS-REFERENCE TO RELATED APPLICATIONS

This application claims benefit of priority under 35 U.S.C. § 119 to Chinese Patent Application No. 202311007002.9, filed on Aug. 10, 2023, in the China National Intellectual Property Administration, the disclosure of which is incorporated by reference herein in its entirety.

BACKGROUND

1. Field

The present disclosure relates generally to the field of communication, and more particularly, to an audio sharing method, and a user device and audio playing device for executing the audio sharing method.

2. Description of Related Art

Presently, when at least one audio playing device of a set of audio playing devices (e.g., an earphone pair) that may be connected via a short-range wireless communication technology (e.g., Bluetooth™, and the like) to an audio source electronic device (e.g., a first user device) needs to be switched to another audio source electronic device (e.g., a second user device), the at least one audio playing device may typically be switched over to as a set. That is, all the audio playing devices of the set of audio playing devices (e.g., the earphone pair) may be switched simultaneously when switching to the another audio source electronic device. However, switching a single audio playing device that belongs to a set of audio playing devices may not be supported by the related audio playing devices. Alternatively or additionally, as a distinct audio connection may be simultaneously required for each audio playing device when switching the at least one audio playing device, a number of audio links may be greater than the number of users sharing the audio playing device. For example, assuming that the audio playing devices comprise earphone pairs, a number of audio links required by the audio playing devices may be twice (e.g., two (2) times) the number of users sharing the audio playing devices. As a result, a switching resource overhead may be greater than that of one audio playing device and a small number of shared users. Alternatively or additionally, after the at least one audio playing device is switched to other audio source electronic devices, an audio message of the original audio source may not be received, which may cause a poor user experience.

Moreover, when a plurality of at least one audio playing devices (e.g., a plurality of earphone pairs) needs to be switched to a same audio source electronic device, a user may typically be required to make a one-to-one connection between the audio source electronic device and each audio playing device. Thus, when the number of audio playing devices in the plurality of at least one audio playing devices is significant, the user may need to perform a significant number of connection operations, further causing a poor user experience.

SUMMARY

According to an aspect of the present disclosure, a method of audio sharing to be performed by a first user device is provided. The method includes advertising, by the first user device, an audio sharing message including a predetermined set identification, based on an indication from a user to share an audio content. The first user device having established a first short-range wireless connection with a first audio playing device of a plurality of audio playing devices. The method further includes receiving, by the first user device from a second audio playing device of the plurality of audio playing devices, an audio sharing confirmation message including the predetermined set identification and indicating that the second audio playing device has switched from an original set identification to the predetermined set identification based on the audio sharing message. The second audio playing device having been instructed to switch to the predetermined set identification through a second short-range wireless connection established with a second user device. The second audio playing device being at least one audio playing device of the second user device. The method further includes establishing, by the first user device, a third short-range wireless connection with the second audio playing device. The method further includes sending, by the first user device, an audio data packet of the audio content to the first audio playing device, using the first short-range wireless connection, and the second audio playing device, using the third short-range wireless connection.

In some embodiments, the method of audio sharing may further include sending, by the first user device to the first audio playing device, based on the indication from the user to share the audio content, a set identification switch message instructing the first audio playing device to switch from the original set identification to the predetermined set identification.

In some embodiments, the method of audio sharing may further include sending, by the first user device to the first audio playing device, based on another indication from the user to terminate the sharing of the audio content, a set identification restore message instructing the first audio playing device to restore the original set identification.

In some embodiments, the method of audio sharing may further include disconnecting, by the first user device, based on the another indication from the user to terminate the sharing of the audio content, the third short-range wireless connection with the second audio playing device.

According to an aspect of the present disclosure, a method of audio sharing to be performed by a second user device is provided. The method includes receiving, by the second user device from a first user device, an audio sharing message including a predetermined set identification. The audio sharing message having been advertised by the first user device based on an indication from a first user to share an audio content of a second user. The method further includes instructing a second audio playing device to switch from an original set identification to the predetermined set identification, causing the second audio playing device to advertise, after switching to the predetermined set identification, an audio sharing confirmation message including the predetermined set identification, and to receive, from the first user device using a first short-range wireless connection, an audio data packet of the audio content. The second audio playing device being at least one audio playing device of the second user device. The second user device having established a second short-range wireless connection with the second audio playing device.

In some embodiments, the method of audio sharing may further include disconnecting, by the second user device, the second short-range wireless connection with the second audio playing device, after the instructing of the second audio playing device to switch from the original set identification to the predetermined set identification. The disconnecting of the second short-range wireless connection may include disconnecting at least one Bluetooth Connected Isochronous Stream (CIS) connection.

In some embodiments, the method of audio sharing may further include receiving, from the second audio playing device, a set identification restore message indicating that the second user device has restored the original set identification, and establishing a third short-range wireless connection with the second audio playing device. The establishing of the third short-range wireless connection may include establishing at least another Bluetooth CIS connection.

According to an aspect of the present disclosure, a method of audio sharing to be performed by a second audio playing device is provided. The method includes receiving, by the second audio playing device from a second user device, an indication instructing the second audio playing device to switch from an original set identification to a predetermined set identification. The indication having been transmitted based on a first indication of a first user to share an audio content of a second user, the second audio playing device being at least one audio playing device of the second user device. The second audio playing device having established a first short-range wireless connection with the second user device. The method further includes switching, by the second audio playing device, from the original set identification to the predetermined set identification. The method further includes advertising, by the second audio playing device, an audio sharing confirmation message including the predetermined set identification. The method further includes establishing, by the second audio playing device, a second short-range wireless connection with a first user device. The method further includes receiving, by the second audio playing device from the first user device, an audio data packet of the audio content using the second short-range wireless connection.

In some embodiments, the method of audio sharing may further include disconnecting, by the second audio playing device, the first short-range wireless connection with the second user device, after the advertising of the audio sharing confirmation message. The disconnecting of the first short-range wireless connection may include disconnecting at least one Bluetooth CIS connection.

In some embodiments, the method of audio sharing may further include disconnecting, by the second audio playing device, the second short-range wireless connection with the first user device, based on a second indication of the first user to terminate the sharing of the audio content.

In some embodiments, the method of audio sharing may further include, based on a second indication of the first user to terminate the sharing of the audio content, restoring the original set identification and sending, to the second user device, a set identification restore message indicating that the second user device has restored the original set identification. The method may further include establishing a third short-range wireless connection with the second user device. The establishing of the third short-range wireless connection may include establishing at least another Bluetooth CIS connection.

According to an aspect of the present disclosure, a first user device is provided. The first user device includes a memory storing instructions and a processor communicatively coupled to the memory. The processor is configured to execute the instructions to advertise an audio sharing message including a predetermined set identification, based on an indication from a user to share an audio content. The first user device having established a first short-range wireless connection with a first audio playing device of a plurality of audio playing devices. The processor is further configured to execute the instructions to receiving, from a second audio playing device of the plurality of audio playing devices, an audio sharing confirmation message including the predetermined set identification and indicating that the second audio playing device has switched from an original set identification to the predetermined set identification based on the audio sharing message. The second audio playing device having been instructed to switch to the predetermined set identification through a second short-range wireless connection established with a second user device. The second audio playing device being at least one audio playing device of the second user device. The processor is further configured to execute the instructions to establish a third short-range wireless connection with the second audio playing device. The processor is further configured to execute the instructions to send an audio data packet of the audio content to the first audio playing device, using the first short-range wireless connection, and the second audio playing device, using the third short-range wireless connection.

In some embodiments, the processor of the first user device may be further configured to execute the instructions to send, to the first audio playing device, based on the indication from the user to share the audio content, a set identification switch message instructing the first audio playing device to switch from the original set identification to the predetermined set identification.

In some embodiments, the processor of the first user device may be further configured to execute the instructions to send, to the first audio playing device, based on another indication from the user to terminate the sharing of the audio content, a set identification restore message instructing the first audio playing device to restore the original set identification.

In some embodiments, the processor of the first user device may be further configured to execute the instructions to disconnect, based on the another indication from the user to terminate the sharing of the audio content, the third short-range wireless connection with the second audio playing device.

According to an aspect of the present disclosure, a second user device is provided. The second user device includes a memory storing instructions and a processor communicatively coupled to the memory. The processor is configured to execute the instructions to receive, from a first user device, an audio sharing message including a predetermined set identification. The audio sharing message having been advertised by the first user device, based on an indication from a first user to share an audio content of a second user. The processor is configured to execute the instructions to instruct a second audio playing device to switch from an original set identification to the predetermined set identification, causing the second audio playing device to advertise, after switching to the predetermined set identification, an audio sharing confirmation message including the predetermined set identification, and to receive, from the first user device using a first short-range wireless connection, an audio data packet of the audio content. The second audio playing device being at least one audio playing device of the second user device. The second user device having established a second short-range wireless connection with the second audio playing device.

In some embodiments, the processor of the second user device may be further configured to execute the instructions to disconnect the second short-range wireless connection with the second audio playing device. Disconnecting the second short-range wireless connection may include to disconnect at least one Bluetooth CIS connection.

In some embodiments, the processor of the second user device may be further configured to execute the instructions to receive, from the second audio playing device, a set identification restore message indicating that the second user device has restored the original set identification, and establish a third short-range wireless connection with the second audio playing device. Establishing the third short-range wireless connection may include to establish at least another Bluetooth CIS connection.

According to an aspect of the present disclosure, an audio playing device is provided. The audio playing device includes a memory storing instructions and a processor communicatively coupled to the memory. The processor is configured to execute the instructions to receive, from a second user device, an indication instructing the audio playing device to switch from an original set identification of the audio playing device to a predetermined set identification. The audio playing device being at least one audio playing device of the second user device. The audio playing device having established a first short-range wireless connection with the second user device. The processor is further configured to execute the instructions to switch from the original set identification of the audio playing device to the predetermined set identification. The processor is further configured to execute the instructions to advertise an audio sharing confirmation message including the predetermined set identification. The processor is further configured to execute the instructions to establish a second short-range wireless connection with a first user device. The processor is further configured to execute the instructions to receive, from the first user device, an audio data packet of an audio content using the second short-range wireless connection.

In some embodiments, the processor of the audio playing device may be further configured to execute the instructions to disconnect the first short-range wireless connection with the second user device. Disconnecting the first short-range wireless connection may include to disconnect at least one Bluetooth CIS connection.

In some embodiments, the processor of the audio playing device may be further configured to execute the instructions to disconnect the second short-range wireless connection with the first user device, based on a second indication of a user to terminate the sharing of the audio content.

In some embodiments, the processor of the audio playing device may be further configured to execute the instructions to, based on a second indication of a user to terminate the sharing of the audio content, restore the original set identification and send, to the second user device, a set identification restore message indicating that the second user device has restored the original set identification. The processor may be further configured to execute the instructions to establish a third short-range wireless connection with the second user device. Establishing the third short-range wireless connection may include to establish at least another Bluetooth CIS connection.

According to an aspect of the present disclosure, an audio sharing system is provided. The audio sharing system includes a first user device including a first memory storing first instructions, and a first processor communicatively coupled to the first memory, a second user device including a second memory storing second instructions, and a second processor communicatively coupled to the second memory, and a plurality of audio playing devices including a first audio playing device and a second audio playing device. The first processor is configured to execute the first instructions to advertise an audio sharing message including a predetermined set identification, based on an indication from a first user to share an audio content. The first user device having established a first short-range wireless connection with the first audio playing device. The first processor is further configured to execute the first instructions to receiving, from the second audio playing device, an audio sharing confirmation message including the predetermined set identification and indicating that the second audio playing device has switched from an original set identification to the predetermined set identification based on the audio sharing message. The second audio playing device having been instructed to switch to the predetermined set identification through a second short-range wireless connection established with a second user device. The second audio playing device being at least one audio playing device of the second user device. The first processor is further configured to execute the first instructions to establish a third short-range wireless connection with the second audio playing device. The first processor is further configured to execute the first instructions to send an audio data packet of the audio content to the first audio playing device, using the first short-range wireless connection, and the second audio playing device, using the third short-range wireless connection. The second processor is configured to execute the second instructions to receive, from the first user device, the audio sharing message including the predetermined set identification. The audio sharing message having been advertised by the first user device, based on the indication from the first user to share the audio content. The second processor is further configured to execute the second instructions to instruct the second audio playing device to switch from the original set identification to the predetermined set identification, causing the second audio playing device to advertise, after switching to the predetermined set identification, the audio sharing confirmation message including the predetermined set identification, and to receive, from the first user device using the first short-range wireless connection, the audio data packet of the audio content. The second user device having established the second short-range wireless connection with the second audio playing device. An audio playing device of the plurality of audio playing devices is configured to receive, from the second user device, an indication instructing the audio playing device to switch from the original set identification of the audio playing device to the predetermined set identification. The audio playing device having established the first short-range wireless connection with the second user device. The audio playing device is further configured to switch from the original set identification of the audio playing device to the predetermined set identification. The audio playing device is further configured to advertise the audio sharing confirmation message including the predetermined set identification. The audio playing device is further configured to establish the second short-range wireless connection with the first user device. The audio playing device is further configured to receive, from the first user device, the audio data packet using the second short-range wireless connection.

According to an aspect of the present disclosure, an electronic device is provided. The electronic device includes a memory on which computer executable instructions are stored and a processor, when executed by the processor, the instructions executing a method of audio sharing as described herein.

According to an aspect of the present disclosure, a computer-readable medium on which computer executable instructions are stored is provided. The computer executable instructions, when executed, executing a method of audio sharing as described herein.

According to the exemplary embodiment of the present disclosure, by advertising, scanning, configuring, switching and restoring a set identification, any number of audio playing devices may be switched efficiently and flexibly among user devices as audio sources. Moreover, since an audio may be shared with a single audio playing device of a plurality of audio playing devices through another user device, a plurality of audio links may be shared with a plurality of users with a relatively small overhead when compared to related audio playing devices. Consequently, audio reception may be maintained with a previously connected user device through an audio playing device of a plurality of audio playing devices that may not be connected with the another user device. Alternatively or additionally, after terminating the audio sharing, the audio playing device may automatically restore the connection with the previous user device without excessive operations of the user, and thus, may improve user convenience and may enhance user experience.

Additional aspects may be set forth in part in the description which follows and, in part, may be apparent from the description, and/or may be learned by practice of the presented embodiments.

BRIEF DESCRIPTION OF DRAWINGS

The above and other aspects, features, and advantages of certain embodiments of the present disclosure may become more apparent from the following description taken in conjunction with the accompanying drawings, in which.

DETAILED DESCRIPTION

Figure 1:
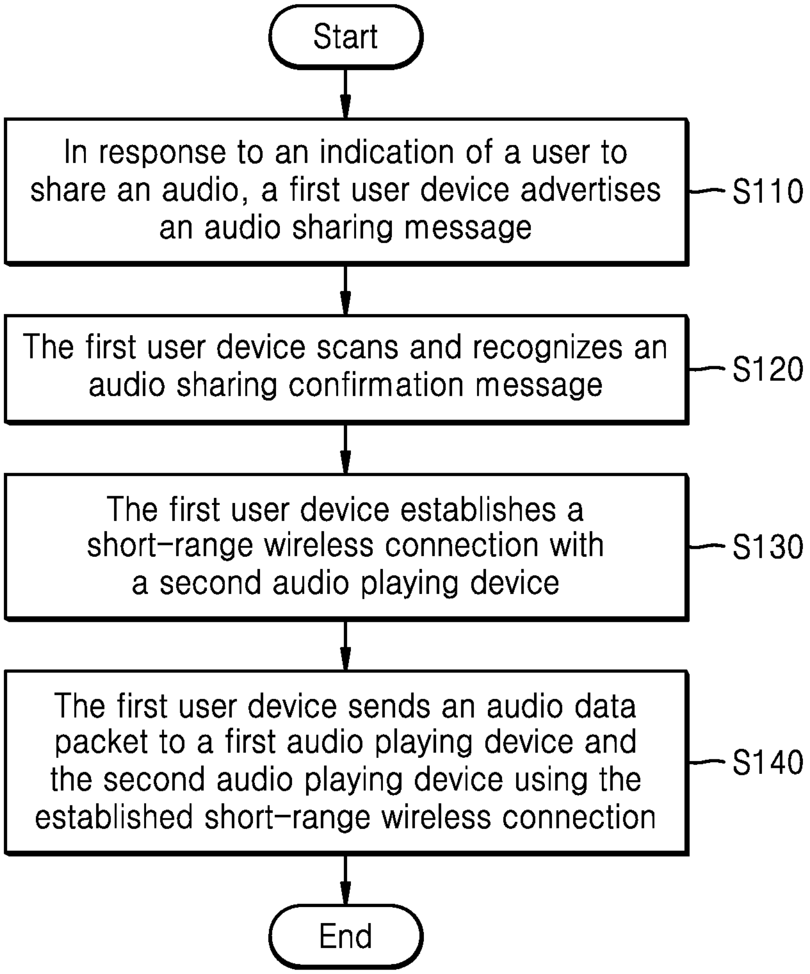
FIG. 1 is a flowchart illustrating an audio sharing method, according to an exemplary embodiment of the present disclosure.

Hereinafter, various exemplary embodiments of the present disclosure are described with reference to the accompanying drawings, in which the same reference numerals are used to depict the same or similar elements, features, and structures. However, the present disclosure is not intended to be limited by the various embodiments described herein to a specific embodiment and it is intended that the present disclosure covers possible modifications, equivalents, and/or alternatives of the present disclosure, provided they come within the scope of the appended claims and their equivalents. The terms and words used in the following description and claims may not be limited to their dictionary meanings, but may be merely used to enable a clear and consistent understanding of the present disclosure. Accordingly, it may be apparent to those skilled in the art that the following description of various embodiments of the present disclosure may be provided for illustration purpose only and not for the purpose of limiting the present disclosure as defined by the appended claims and their equivalents.

It is to be understood that the singular forms include plural forms, unless the context clearly indicates otherwise. The terms "include", "contain", and "have", as used herein, may indicate disclosed functions, operations, and/or the existence of elements, but may not exclude other functions, operations, or elements.

For example, the expressions "A or B", or "at least one of A and/or B" may indicate A and B, and A or B. For another example, the expression "A or B" or "at least one of A and/or B" may indicate (1) A, (2) B, or (3) both A and B.

In various embodiments of the present disclosure, it is intended that when a component (e.g., a first component) is referred to as being "coupled" or "connected" with/to another component (e.g., a second component), the component may be directly connected to the another component or may be connected through another component (e.g., a third component). In another example, when a component (e.g., a first component) is referred to as being "directly coupled" or "directly connected" with/to another component (e.g., a second component), another component (e.g., a third component) may not exist between the component and the another component.

The expression "configured to", used in describing various embodiments of the present disclosure, may be used interchangeably with expressions such as "suitable for", "having the capacity to", "designed to", "adapted to", "made to", and "capable of", for example, according to the situation. The term "configured to" may not necessarily indicate "specifically designed to" in terms of hardware. Instead, the expression "a device configured to . . . " in some situations may indicate that the device and another device or part are "capable of . . . ". For example, the expression "a processor configured to perform A, B, and C" may indicate a dedicated processor (e.g., an embedded processor) for performing a corresponding operation or a general purpose processor (e.g., a central processing unit (CPU), an application processor (AP)) for performing corresponding operations by executing at least one software program stored in a memory device.

The terms used herein may describe certain embodiments of the present disclosure, but may not be intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure may not be intended to be interpreted as excluding embodiments of the present disclosure.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, various embodiments of the present disclosure are described with reference to the accompanying drawings, FIG. 1 is a flowchart illustrating an audio sharing method, according to an exemplary embodiment of the present disclosure. In an embodiment, a first user device may share an audio (e.g., an audio signal, an audio content, an audio file, and the like) with at least two audio playing devices. In an optional or additional embodiment, a first audio playing device of the at least two audio playing devices may initially establish a short-range wireless connection with the first user device. Alternatively or additionally, a second audio playing device of the at least two audio playing devices may initially establish a short-range wireless connection with a second user device. For example, the first user device may be connected with an audio playing device via a short-range wireless communication such as, but not limited to, Bluetooth™, Bluetooth Low Energy (BLE), and the like. In such an example, transmission of control information with the audio playing device may be performed via an Asynchronous Connection-oriented Logical Transport (ACL). Alternatively or additionally, audio transmission (e.g., audio data, audio signal, audio content, and the like) with the audio playing device may be performed via a Bluetooth Connected Isochronous Stream (CIS). In an embodiment, the audio sharing method shown in FIG. 1 may be executed by the first user device.

Referring to FIG. 1, at operation S110, in response to an indication of a user to share an audio content, the first user device may advertise (e.g., broadcast, transmit) an audio sharing message. The audio sharing message may include a predetermined set identification. In an embodiment, the second user device, scanning (e.g., receiving) the audio sharing message, may indicate to the second audio playing device to switch its original set identification to the predetermined set identification. Alternatively or additionally, the second audio playing device may advertise an audio sharing confirmation message. In an embodiment, the second audio playing device may be at least one audio playing device of the second user device. In an optional or additional embodiment, the second audio playing device may establish the short-range wireless connection with the second user device.

In an optional or additional embodiment, in response to the indication of the user to share the audio, the first user device may send a set identification switch message to the first audio playing device. The set identification switch message may indicate to the first audio playing device to switch from its original set identification to the predetermined set identification.

At operation S120, the first user device may scan and/or recognize the audio sharing confirmation message. In an embodiment, the audio sharing confirmation message may include the predetermined set identification.

At operation S130, the first user device may establish a short-range wireless connection with the second audio playing device.

At operation S140, the first user device may send an audio data packet to the first audio playing device and the second audio playing device using the established short-range wireless connections.

In an optional or additional embodiment, in response to an indication of the user to terminate sharing of the audio content, the first user device may send a set identification restore message to the first audio playing device. The set identification restore message may indicate to the first audio playing device to restore its original set identification.

Alternatively or additionally, in response to the indication of the user to terminate sharing of the audio, the first user device may disconnect the short-range wireless connection with the second audio playing device.

In an embodiment, a predetermined period of time may be set for an operation in which the first user device scans and recognizes the audio sharing confirmation message and connects with the second audio playing device. That is, the first user device may be configured to receive the audio sharing confirmation message advertised by the second audio playing device within the predetermined period of time and to connect the audio playing device switched to the predetermined set identification after the end of the predetermined period of time.

Figure 2:
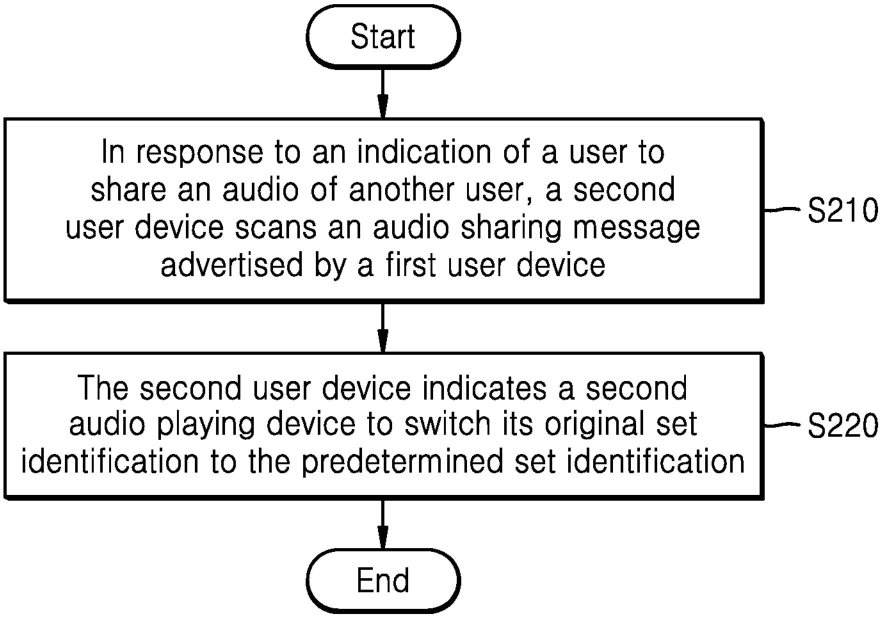
FIG. 2 is a flowchart illustrating an audio sharing method, according to another exemplary embodiment of the present disclosure.

FIG. 2 is a flowchart illustrating an audio sharing method, according to another exemplary embodiment of the present disclosure. In an embodiment, a first user device may share an audio (e.g., an audio signal, an audio content, an audio file, and the like) with at least two audio playing devices. In an optional or additional embodiment, a first audio playing device of the at least two audio playing devices may initially establish a short-range wireless connection with the first user device. Alternatively or additionally, a second audio playing device may initially establish a short-range wireless connection with a second user device. For example, the second audio playing device may be at least one audio playing device of the second user device. In an embodiment, the audio sharing method shown in FIG. 2 may be executed by the second user device.

Referring to FIG. 2, at operation S210, in response to an indication of a user to share an audio content of another user, the second user device may scan an audio sharing message advertised by the first user device. In an embodiment, the audio sharing message may include a predetermined set identification.

At operation S220, the second user device may instruct the second audio playing device to switch from its original set identification to the predetermined set identification. In an embodiment, the second audio playing device may advertise an audio sharing confirmation message after switching to the predetermined set identification. Alternatively or additionally, the second audio playing device may establish a short-range wireless connection with the first user device. For example, the second audio playing device may receive an audio data packet sent by the first user device, using the short-range wireless connection with the first user device. In an embodiment, the audio sharing confirmation message may include the predetermined set identification.

In an optional or additional embodiment, after the second user device has indicated to the second audio playing device to switch its original set identification to the predetermined set identification, the second user device may disconnect the short-range wireless connection with the second audio playing device. In an embodiment, the disconnecting of the short-range wireless connection may include disconnecting at least a Bluetooth CIS connection.

In an embodiment, the second user device may receive a set identification restore message sent by the second audio playing device. The set identification restore message may indicate that the second user device has restored the set identification. Alternatively or additionally, the second user device may establish a short-range wireless connection with the second audio playing device. In an embodiment, the establishing of the short-range wireless connection with the second audio playing device may include establishing at least a Bluetooth CIS connection.

Figure 3:
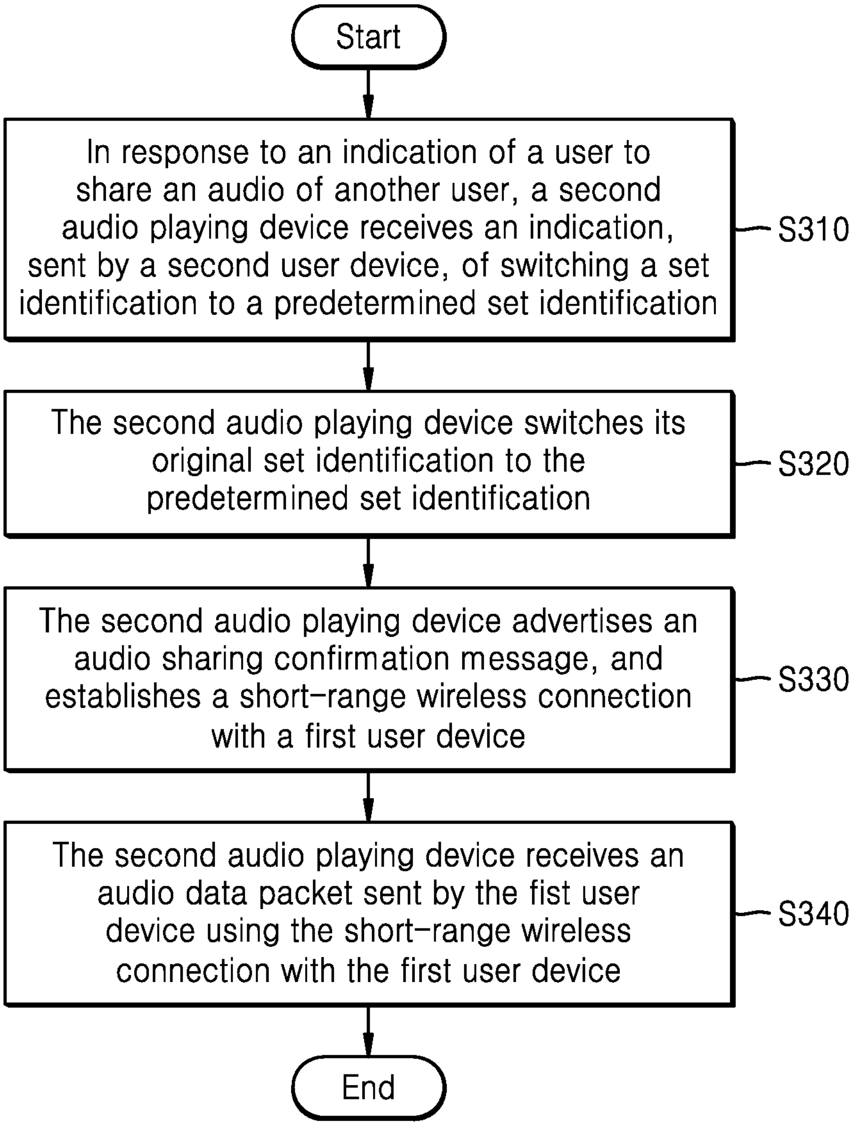
FIG. 3 is a flowchart illustrating an audio sharing method, according to another exemplary embodiment of the present disclosure.

FIG. 3 is a flowchart illustrating an audio sharing method, according to another exemplary embodiment of the present disclosure. In an embodiment, a first user device may share an audio (e.g., an audio signal, an audio content, an audio file, and the like) with at least two audio playing devices. In an optional or additional embodiment, a first audio playing device of the at least two audio playing devices may initially establish a short-range wireless connection with the first user device. Alternatively or additionally, a second audio playing device of the at least two audio playing devices may initially establish a short-range wireless connection with a second user device. For example, the second audio playing device may be at least one audio playing device of the second user device. In an embodiment, the audio sharing method shown in FIG. 3 may be executed by the second audio playing device.

Referring to FIG. 3, at operation S310, in response to an indication of a user to share an audio content of another user, the second audio playing device may receive an indication, sent by the second user device, of switching a set identification to a predetermined set identification.

At operation S320, the second audio playing device may switch from its original set identification to the predetermined set identification.

At operation S330, the second audio playing device may advertise an audio sharing confirmation message. Alternatively or additionally, the second audio playing device may establish a short-range wireless connection with the first user device. In an embodiment, the audio sharing confirmation message may include the predetermined set identification.

At operation S340, the second audio playing device may receive an audio data packet sent by the first user device using the short-range wireless connection with the first user device.

In an embodiment, after the second audio playing device has advertised the audio sharing confirmation message, the second audio playing device may disconnect the short-range wireless connection with the second user device. For example, the disconnecting of the short-range wireless connection may include disconnecting at least a Bluetooth CIS connection.

In an optional or additional embodiment, in response to the indication of the user to terminate the sharing of the audio content, the second audio playing device may disconnect the short-range wireless connection with the first user device.

In another optional or additional embodiment, in response to the indication of the user to terminate the sharing of the audio content, the second audio playing device may restore an original set identification and send a set identification restore message to the second user device. For example, the set identification restore message may indicate that the second user device has restored the set identification, and/or establish a short-range wireless connection with the second user device. In an embodiment, the establishing of the short-range wireless connection may include establishing at least the Bluetooth CIS connection.

Figure 4:
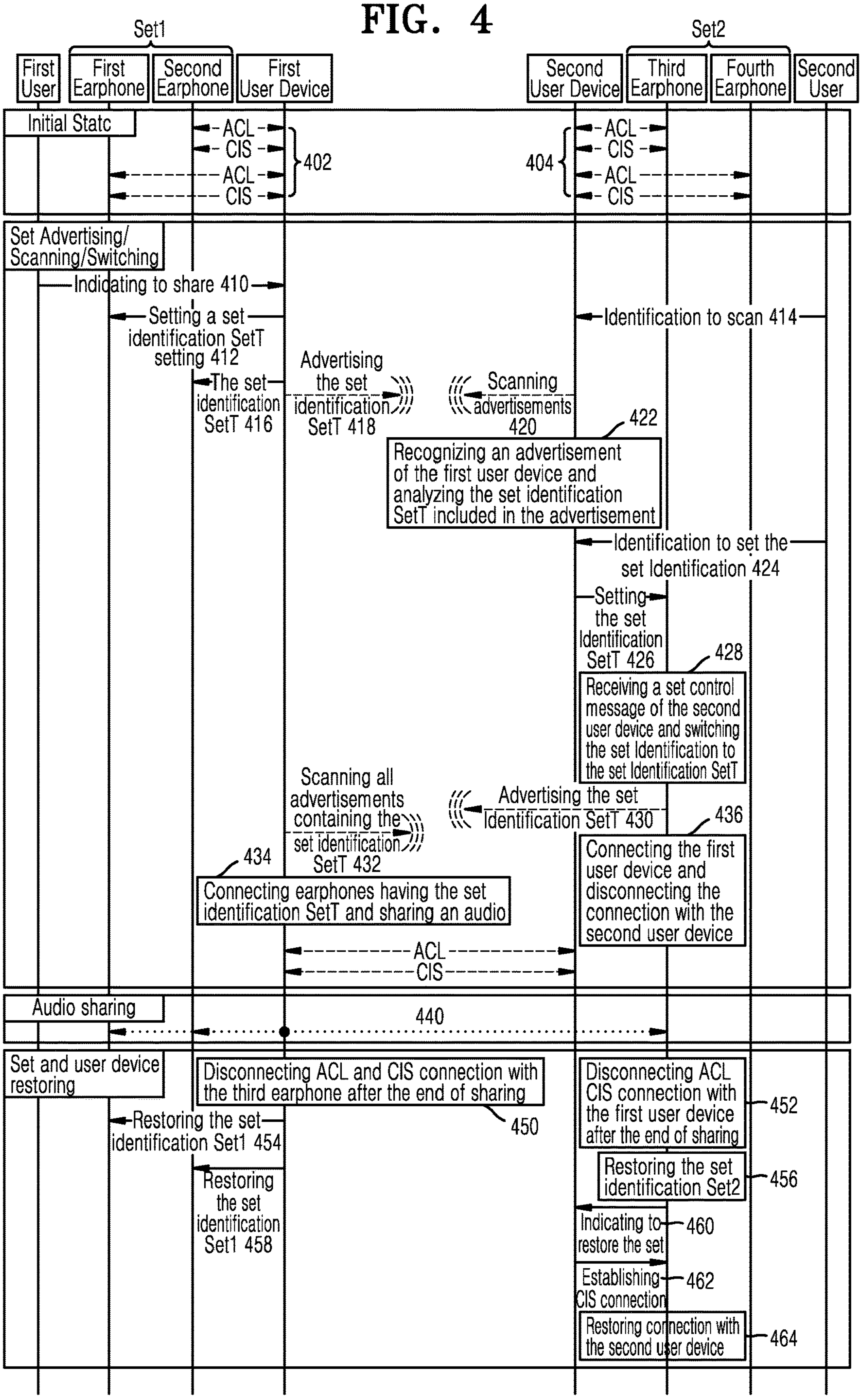
FIG. 4 is a schematic diagram illustrating an audio sharing method, according to an exemplary embodiment of the present disclosure.

The audio sharing method, according to the exemplary embodiments of the present disclosure, shown in FIGS. 1 to 3 is further described in with reference to FIG. 4.

FIG. 4 is a schematic diagram illustrating an audio sharing method, according to an exemplary embodiment of the present disclosure. Although the audio playing devices shown in FIG. 4 are described as a pair of earphones (e.g., first and second earphones, third and fourth earphones), the present disclosure is not limited in this regard. For example, the audio playing devices may comprise a same number of devices (e.g., two (2), as shown in FIG. 4), and/or a different number of devices (e.g., three (3) or more), without departing from the scope of the disclosure.

Referring to FIG. 4, in an initial state, a first earphone and a second earphone belonging to a first earphone pair may belong to a first set Set1 and/or may be in a connected state (402) with the first user device via a short-range wireless connection (e.g., ACL and/or CIS). Alternatively or additionally, a third earphone and a fourth earphone belonging to a second earphone pair may belong to a second set Set2 and/or may be in a connected state (404) with the second user device (e.g., via ACL and/or CIS).

As shown in FIG. 4, when performing a set advertising/scanning/switching operation, a first user of a first user device may indicate to the first user device to enter a sharing mode (410) through an input (e.g., a touch input, a voice input, and the like). The first user device may set a set identification SetT for sharing to the first earphone (412) and the second earphone (416), and/or may advertise the set identification SetT (418). Alternatively or additionally, a second user of a second user device may indicate to the second user device to scan the set identification SetT (414) through an input (e.g., a touch input, a voice input, and the like), so as to receive and/or recognize the set identification SetT advertised by the first user device (420).

In an embodiment, after the second user device has recognized the set identification SetT (422), the second user of the second user device may indicate to switch the third earphone to the set identification SetT (424) through an input (e.g., a touch input, a voice input, and the like). Alternatively or additionally, the second user device may send a set control message (426) including a set identification to the third earphone. Subsequently, the third earphone may switch the current set identification Set2 to the set identification SetT (428) based on the received set control message, and/or advertise the set identification SetT (430).

In an embodiment, the first user device may enter a scan mode to receive and/or recognize the set identification SetT advertised by the third earphone (432). For example, the first user device may enter the scan mode after the end of a predetermined period of time. For another example, the user may indicate when to enter the scan mode. However, the present disclosure is not limited thereto. For example, the first user device may enter the scan mode based on other conditions without departing from the scope of the present disclosure.

In an embodiment, the first user device may automatically connect all the scanned earphones having the set identification SetT (434 and 436). For example, the first user device may automatically connect all the scanned earphones having the set identification SetT after the end of the predetermined period of time, and/or the user may indicate when to enter the scan mode. However, the present disclosure it is not limited thereto. Alternatively or additionally, the earphone having the set identification SetT which is to be connected to the first user device may firstly disconnect from the second user device (such as, but not limited to, disconnecting the CIS) (438).

Continuing to refer to FIG. 4, when performing an audio sharing operation (440), the first user device may share the audio data packet to the first, second and third earphones via a short-range wireless connection such as, but not limited to, Bluetooth™.

After the end of sharing, the first user device may disconnect from the third earphone (e.g., disconnecting the ACL and CIS) (450 and 452), the third earphone may restore the set identification SetT to the set identification Set2 (456), and the first earphone and the second earphone may restore the set identification SetT to the set identification Set1 (454 and 458). Alternatively or additionally, the third earphone may send a message indicating set restoration to the second user device (460), so that the connection with the second user device may be restored (e.g., restoring the CIS) and an audio of the second user device may be received (462 and 464).

As shown in FIG. 4, the first user device may set the set identifications of the first earphone and the second earphone to SetT and advertise SetT instead of directly advertising Set1 in order to provide security. That is, if the first user device advertises the set identification Set1 directly, the first user device may omit the setting of the set identifications of the first earphone and the second earphone to SetT and the restoring of the set identifications SetT of the first earphone and the second earphone to the set identification Set1 after the end of the audio sharing. However, security may be preserved by having the first user device set the set identifications of the first earphone and the second earphone to SetT and advertise SetT.

It may be understood that the audio sharing method, according to an exemplary embodiment of the present disclosure, as shown in FIG. 4 is only an example, and those skilled in the art may modify the configuration and operation in FIG. 4, according to design constraints, without departing from the scope of the present disclosure. For example, the device waiting for the first user device to share an audio may not be limited to the second user device, and/or the earphone connected to the first user device may not be limited to the third earphone, and the like.

Figure 5:
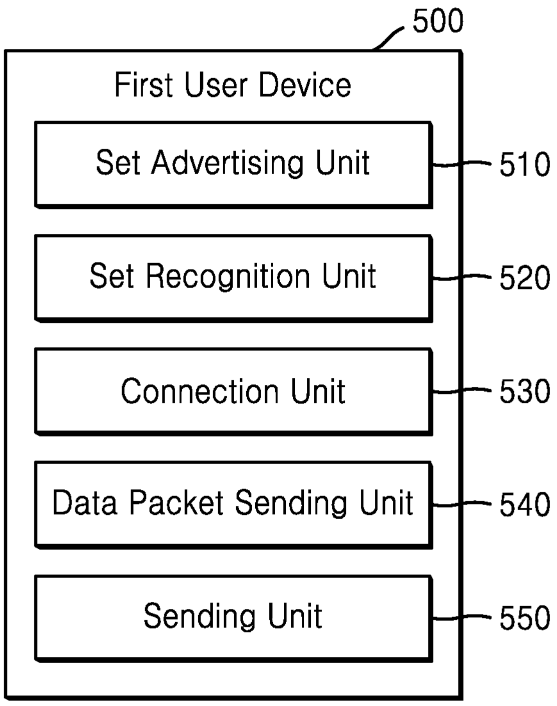
FIG. 5 is a block diagram illustrating a first user device, according to an exemplary embodiment of the present disclosure.

FIG. 5 is a block diagram illustrating a first user device, according to an exemplary embodiment of the present disclosure. In an embodiment, a first user device may share an audio (e.g., an audio signal, an audio content, an audio file, and the like) with at least two audio playing devices. In an optional or additional embodiment, a first audio playing device of the at least two audio playing devices may initially establish a short-range wireless connection with the first user device. Alternatively or additionally, a second audio playing device of the at least two audio playing devices may initially establish a short-range wireless connection with a second user device. For example, the second audio playing device may be at least one audio playing device of the second user device. Referring to FIG. 5, a first user device 500 may include a set advertising unit 510, a set recognition unit 520, a connection unit 530, a data packet sending unit 540, and a sending unit 550.

The set advertising unit 510 may be configured to, in response to an instruction of a user to share an audio content, advertise an audio sharing message that may include a predetermined set identification, such that a second user device scanning the audio sharing message may indicate (e.g., instruct) to a second audio playing device to switch from its original set identification to the predetermined set identification, and the second audio playing device may advertise an audio sharing confirmation message. The second audio playing device may be at least one audio playing device of the second user device. The second audio playing device may establish a short-range wireless connection with the second user device.

The set recognition unit 520 may be configured to scan and recognize the audio sharing confirmation message. In an embodiment, the audio sharing confirmation message may include the predetermined set identification.

The connection unit 530 may be configured to establish a short-range wireless connection with the second audio playing device. Alternatively or additionally, the connection unit 530 may further be configured to, in response to an indication of the user to terminate sharing of the audio, disconnect the short-range wireless connection with the second audio playing device.

The data packet sending unit 540 may be configured to send an audio data packet to the first audio playing device and the second audio playing device using the established short-range wireless connections.

The sending unit 550 may be configured to, in response to an indication of the user to share the audio, send a set identification switch message to the first audio playing device. The set identification switch message may indicate (e.g., instruct) to the first audio playing device to switch from its original set identification to the predetermined set identification. Alternatively or additionally, the sending unit 550 may further be configured to, in response to the indication of the user to terminate sharing of the audio, send a set identification restore message to the first audio playing device. The set identification restore message may indicate (e.g., instruct) to the first audio playing device to restore its original set identification.

It should be noted that the number and arrangement of components of the first user device 500 shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Alternatively or additionally, a set of (one or more) components shown in FIG. 5 may be integrated with each other, and/or may be implemented as an integrated circuit, as software, and/or a combination of circuits and software.

Figure 6:
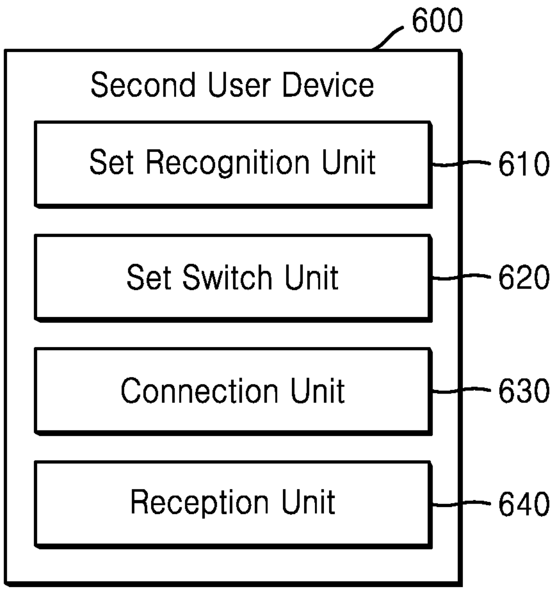
FIG. 6 is a block diagram illustrating a second user device, according to an exemplary embodiment of the present disclosure.

FIG. 6 is a block diagram illustrating a second user device, according to an exemplary embodiment of the present disclosure. In an embodiment, a first user device may share an audio (e.g., an audio signal, an audio content, an audio file, and the like) with at least two audio playing devices. In an optional or additional embodiment, a first audio playing device of the at least two audio playing devices may initially establish a short-range wireless connection with the first user device. Alternatively or additionally, a second audio playing device of the at least two audio playing devices may initially establish a short-range wireless connection with a second user device. For example, the second audio playing device may be at least one audio playing device of the second user device. Referring to FIG. 6, a second user device 600 may include a set recognition unit 610, a set switch unit 620, a connection unit 630, and a reception unit 640.

The set recognition unit 610 may be configured to, in response to an indication of a user to share an audio content of another user, scan an audio sharing message advertised by the first user device. In an embodiment, the audio sharing message may include a predetermined set identification.

The set switch unit 620 may be configured to indicate to a second audio playing device to switch from its original set identification to the predetermined set identification. In an embodiment, the second audio playing device may advertise an audio sharing confirmation message after switching to the predetermined set identification. In an embodiment, the second audio playing device may establish a short-range wireless connection with the first user device. In such an embodiment, the second audio playing device may receive, via the short-range wireless connection, an audio data packet sent by the first user device. Alternatively or additionally, the audio sharing confirmation message may include the predetermined set identification.

The connection unit 630 may be configured to, after indicating the second audio playing device to switch from its original set identification to the predetermined set identification, disconnect the short-range wireless connection from the second audio playing device. In an embodiment, the disconnecting of the short-range wireless connection may include disconnecting at least a Bluetooth CIS connection. Alternatively or additionally, the connection unit may further be configured to establish a short-range wireless connection with the second audio playing device. In an embodiment, the establishing of the short-range wireless connection may include establishing at least the Bluetooth CIS connection.

The reception unit 640 may be configured to receive a set identification restore message sent by the second audio playing device. In an embodiment, the set identification restore message may indicate that the second user device has restored the set identification.

It should be noted that the number and arrangement of components of the second user device 600 shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Alternatively or additionally, a set of (one or more) components shown in FIG. 6 may be integrated with each other, and/or may be implemented as an integrated circuit, as software, and/or a combination of circuits and software.

Figure 7:
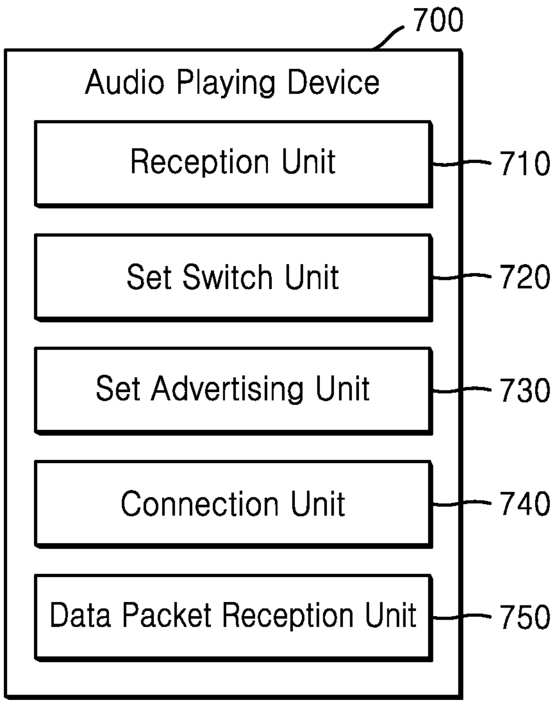
FIG. 7 is a block diagram illustrating an audio playing device, according to an exemplary embodiment of the present disclosure.

FIG. 7 is a block diagram illustrating an audio playing device, according to an exemplary embodiment of the present disclosure. In an embodiment, a first user device may share an audio (e.g., an audio signal, an audio content, an audio file, and the like) with at least two audio playing devices. In an optional or additional embodiment, a first audio playing device of the at least two audio playing devices may initially establish a short-range wireless connection with the first user device. Alternatively or additionally, a second audio playing device of the at least two audio playing devices may initially establish a short-range wireless connection with a second user device. For example, the second audio playing device may be at least one audio playing device of the second user device. Referring to FIG. 7, an audio playing device 700 may include a reception unit 710, a set switch unit 720, a set advertising unit 730, a connection unit 740, and a data packet reception unit 750.

The reception unit 710 may be configured to, in response to an indication of a user to share an audio of another user, receive an indication, sent by the second user device, of switching from a set identification to a predetermined set identification.

The set switch unit 720 may be configured to switch from an original set identification of the audio playing device to the predetermined set identification. Alternatively or additionally, the set switch unit 720 may further be configured to, in response to an indication of the user to terminate sharing of the audio, restore a set identification and/or send a set identification restore message to the second user device. In an embodiment, the set identification restore message may indicate that the second user device has restored the original set identification.

The set advertising unit 730 may be configured to advertise an audio sharing confirmation message. In an embodiment, the audio sharing confirmation message may include the predetermined set identification.

The connection unit 740 may be configured to establish a short-range wireless connection with the first user device. Alternatively or additionally, the connection unit 740 may further be configured to, after the second audio playing device has advertised the audio sharing confirmation message, disconnect the short-range wireless connection from the second user device. In an embodiment, the disconnecting of the short-range wireless connection may include disconnecting at least a Bluetooth CIS connection. In an optional or additional embodiment, the connection unit 740 may further be configured to, in response to an indication of the user to terminate sharing of the audio, disconnect the short-range wireless connection with the first user device. Alternatively or additionally, the connection unit 740 may further be configured to establish a short-range wireless connection with the second user device. In an embodiment, the establishing the short-range wireless connection may include establishing at least the Bluetooth CIS connection.

The data packet reception unit 750 may be configured to receive an audio data packet sent by the first user device using the short-range wireless connection with the first user device.

In an embodiment, each of the first user device 500 of FIG. 5, the second user device 600 of FIG. 6, and/or the audio playing device 700 of FIG. 7 may further include a set control unit (not shown) configured to store the set identifications. For example, the audio playing devices may each have a corresponding set identification (e.g., a persistent set identification). In such an example, the persistent set identification may be used by the audio playing device before the audio playing device switches the connected user device (and switches to the predetermined set identifications) and/or after the audio playing device restores the connected user device. Alternatively or additionally, another set identification switched to when the audio playing device switches the connected user device may be a temporary set identification. That is, the temporary set identification may be used temporarily when the audio playing device switches to another user device. The set control unit may store the persistent set identification and/or the temporary set identification of the audio playing device for subsequent use.

FIGS. 8A to 8E are schematic diagrams illustrating the first user device, the second user device and the audio playing devices, according to an exemplary embodiment of the present disclosure. Although the audio playing devices shown in FIGS. 8A to 8E are described as a pair of earphones (e.g., first and second earphones, third and fourth earphones, fifth and sixth earphones), the present disclosure is not limited in this regard. For example, the number, configuration, and/or connection of the user devices and earphones may be modified by those skilled in the art according to design constraints, without departing from the scope of the disclosure.

Figure 8A:
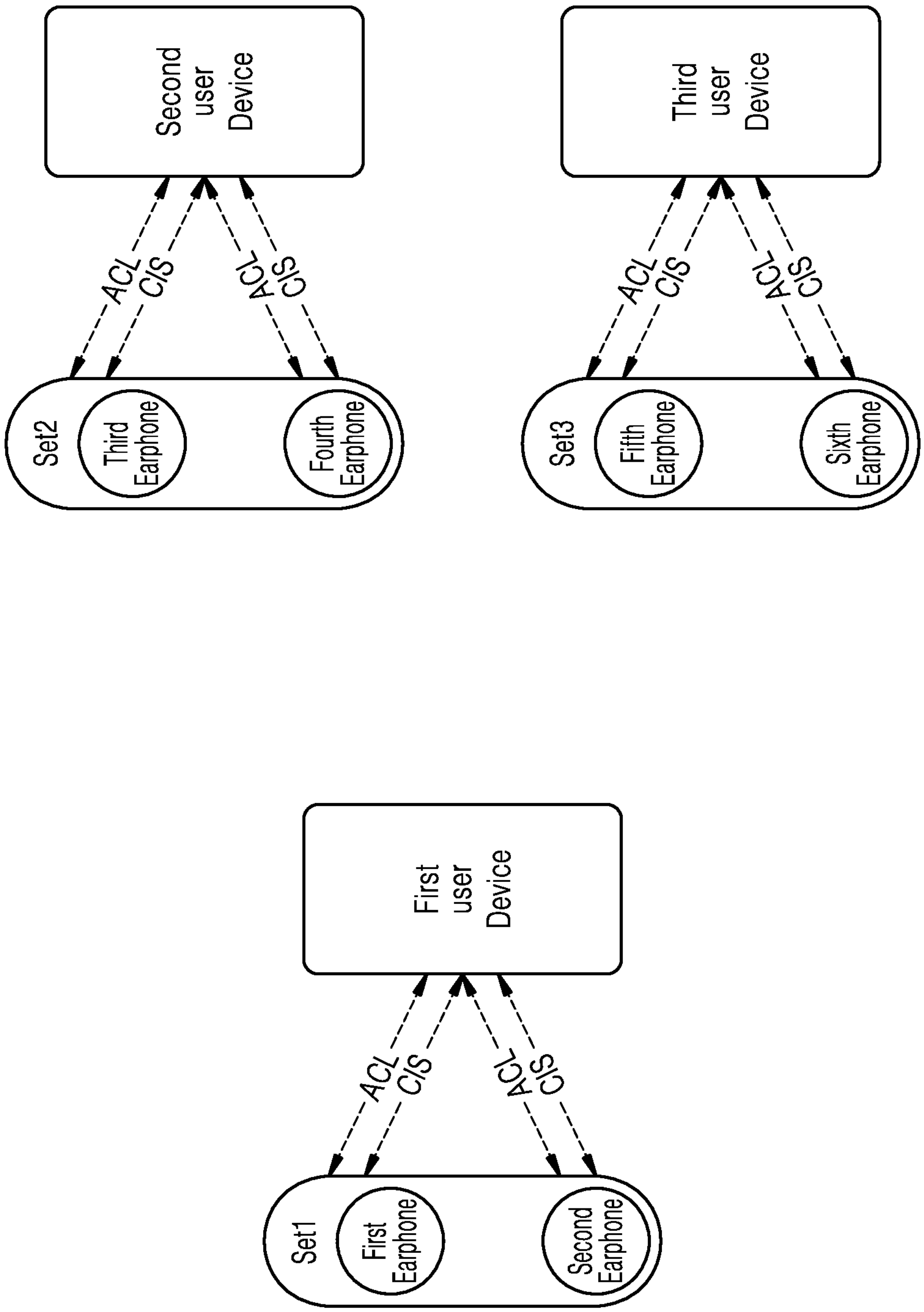
FIGS. 8A to 8E are schematic diagrams illustrating the first user device, the second user device and the audio playing devices, according to an exemplary embodiment of the present disclosure.

Referring to FIG. 8A, the diagram schematically illustrates initial states of the first to third user devices and the first to sixth earphones. As shown in FIG. 8A, the first user device and the first and second earphones may be in a Bluetooth ACL and CIS connection state, and/or the persistent set identifications of the first and second earphones may be Set1. As further shown in FIG. 8A, the second user device and the third and fourth earphones may be in the Bluetooth ACL and CIS connection state, and/or the persistent set identifications of the third and fourth earphones may be Set2. As further shown in FIG. 8A, a third user device and fifth and sixth earphones may be in the Bluetooth ACL and CIS connection state, and/or the persistent set identifications of the fifth and sixth earphones may be Set3.

Figure 8B:
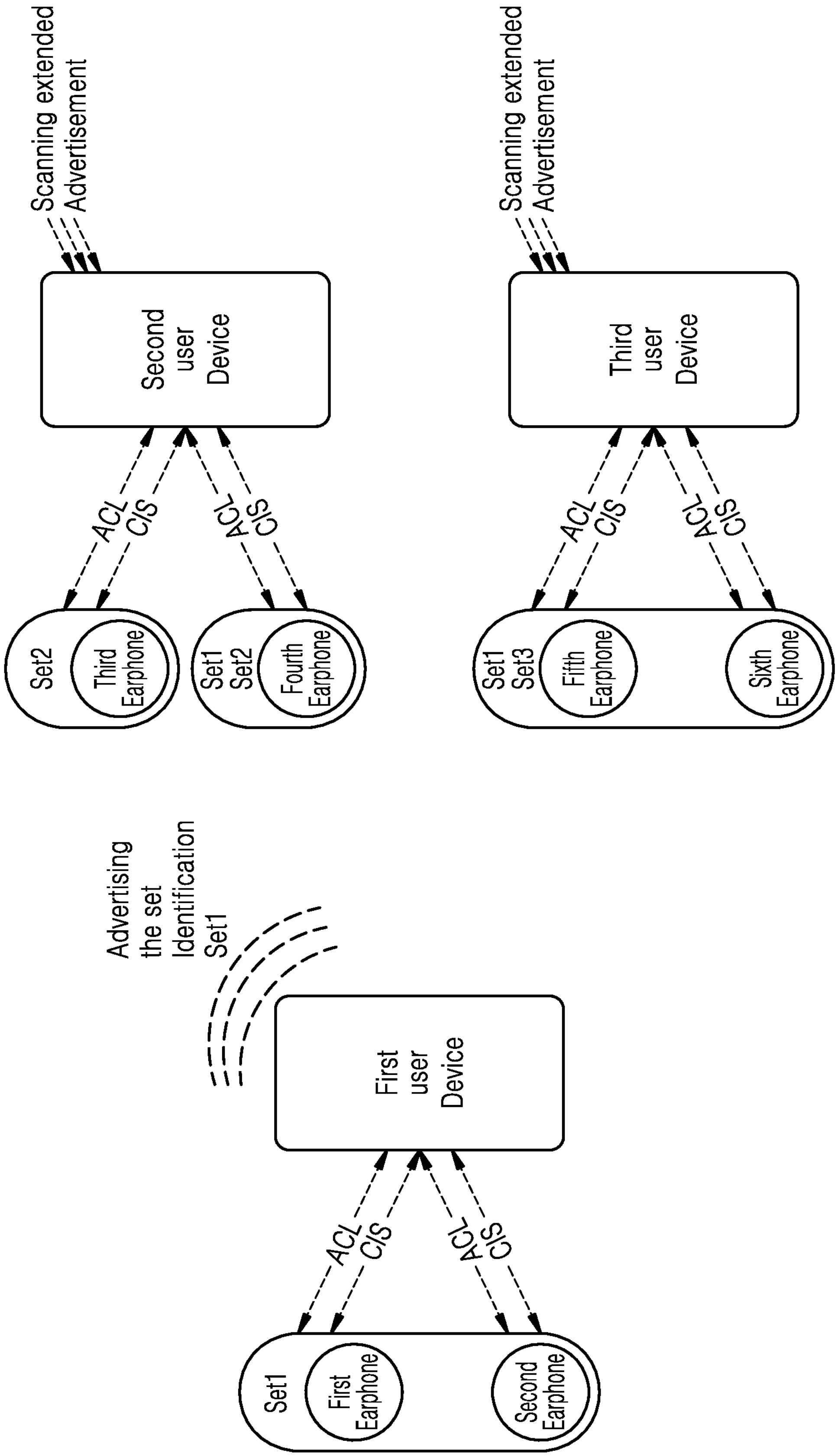

Referring to FIG. 8B, the diagram schematically illustrates advertising and reception of the set identification. As shown in FIG. 8B, a set advertising unit of the first user device may send an extended advertisement to advertise a persistent set identification Set1 of the connected earphone pair. Alternatively or additionally, a set recognition unit of the second user device may receive the extended advertisement to recognize the set identification Set1, and/or a set switch unit of the second user device may send a set control message to indicate the fourth earphone to switch the set identification Set2 to the set identification Set1. In an embodiment, a set recognition unit of the third user device may receive the extended advertisement to recognize the set identification Set1, and/or a set switch unit of the third user device may send a set control message to indicate the fifth and sixth earphones to switch the set identification Set3 to the set identification Set1.

Figure 8C:
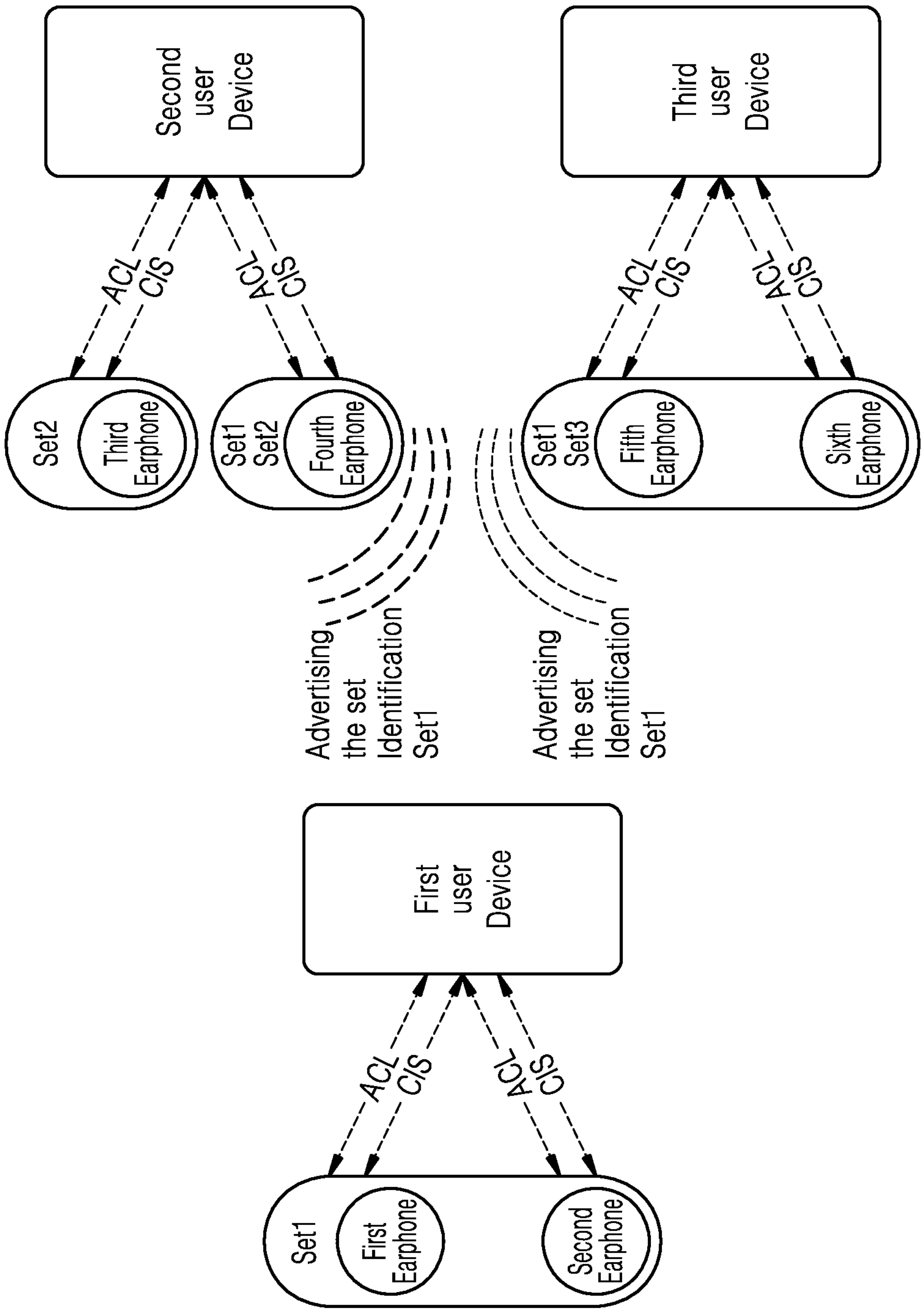

FIG. 8C schematically illustrates switching of the set identifications of the earphones. As shown in FIG. 8C, a reception unit of the fourth earphone may receive a set control message and recognize the switch indication, and/or a set switch unit of the fourth earphone may switch the set identification Set2 to the set identification Set1 according to the indication. Alternatively or additionally, a set advertising unit of the fourth earphone may send the extended advertisement to advertise the set identification Set1. In an embodiment, a set control unit of the fourth earphone may store the set identifications Set1 and Set2. In an optional or additional embodiment, the respective reception units of the fifth and sixth earphones may receive a set control message and/or recognize the switch indication. For example, the respective set switch units of the fifth and sixth earphones may switch the set identification Set3 to the set identification Set1 according to the indication. Alternatively or additionally, the respective set advertising units of the fifth and sixth earphones may send the extended advertisement to advertise the set identification Set1. In an embodiment, the respective set control units of the fifth and sixth earphones may store the set identifications Set1 and Set3.

Figure 8D:
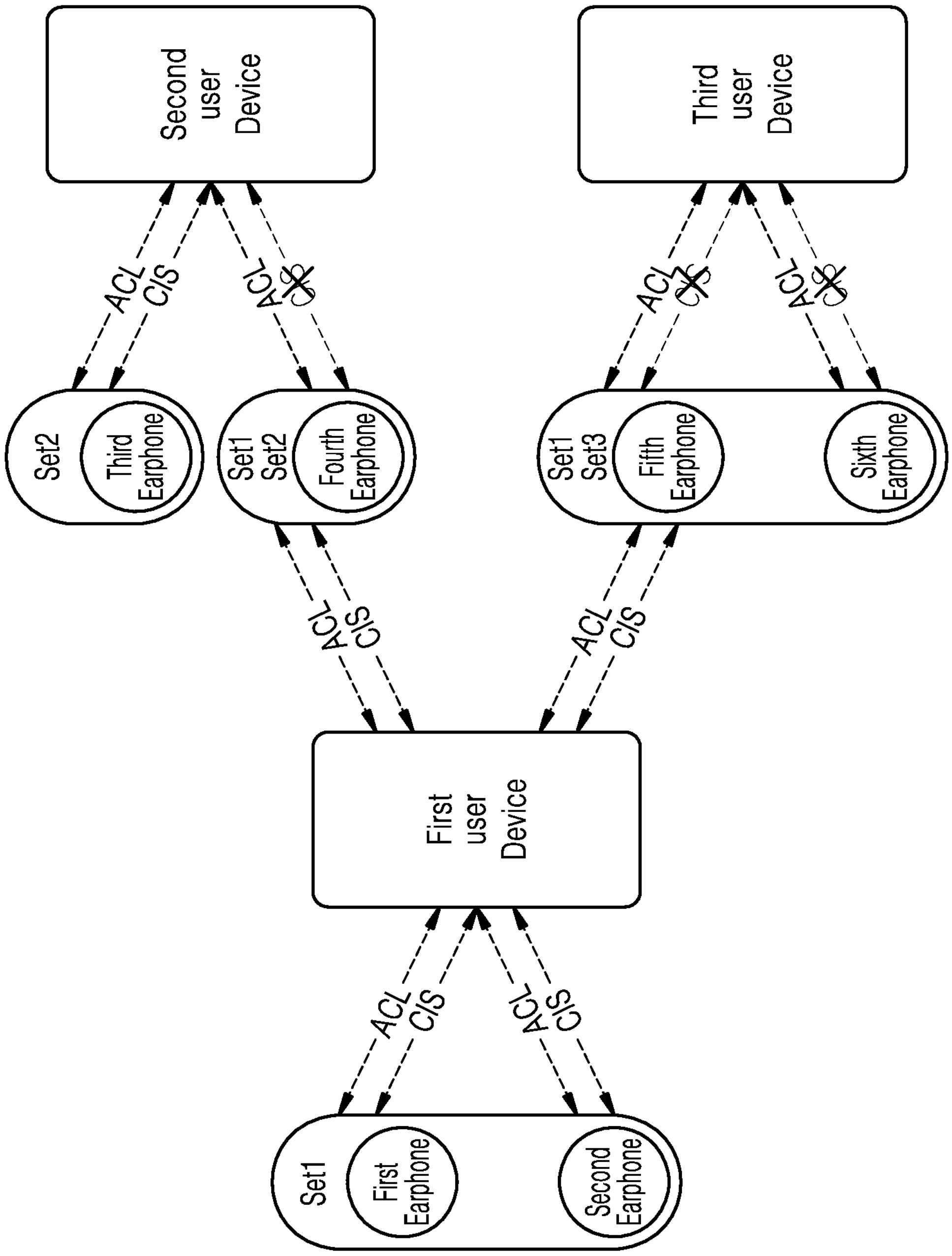

FIG. 8D schematically illustrates switching of the user devices. As shown in FIG. 8D, after a predetermined period of time of advertising the set identification has elapsed, a set recognition unit of the first user device may scan to receive and recognize an advertisement of the set identification Set1, thereby obtaining an address of the earphone belonging to the set identification Set1. After a predetermined period of time of scanning the set identification has elapsed, the first user device may establish an ACL and CIS connection with the scanned earphone belonging to the set identification Set 1 through a connection unit. After completion of the connection, a first electronic device may share an audio content with the connected earphone.

Figure 8E:
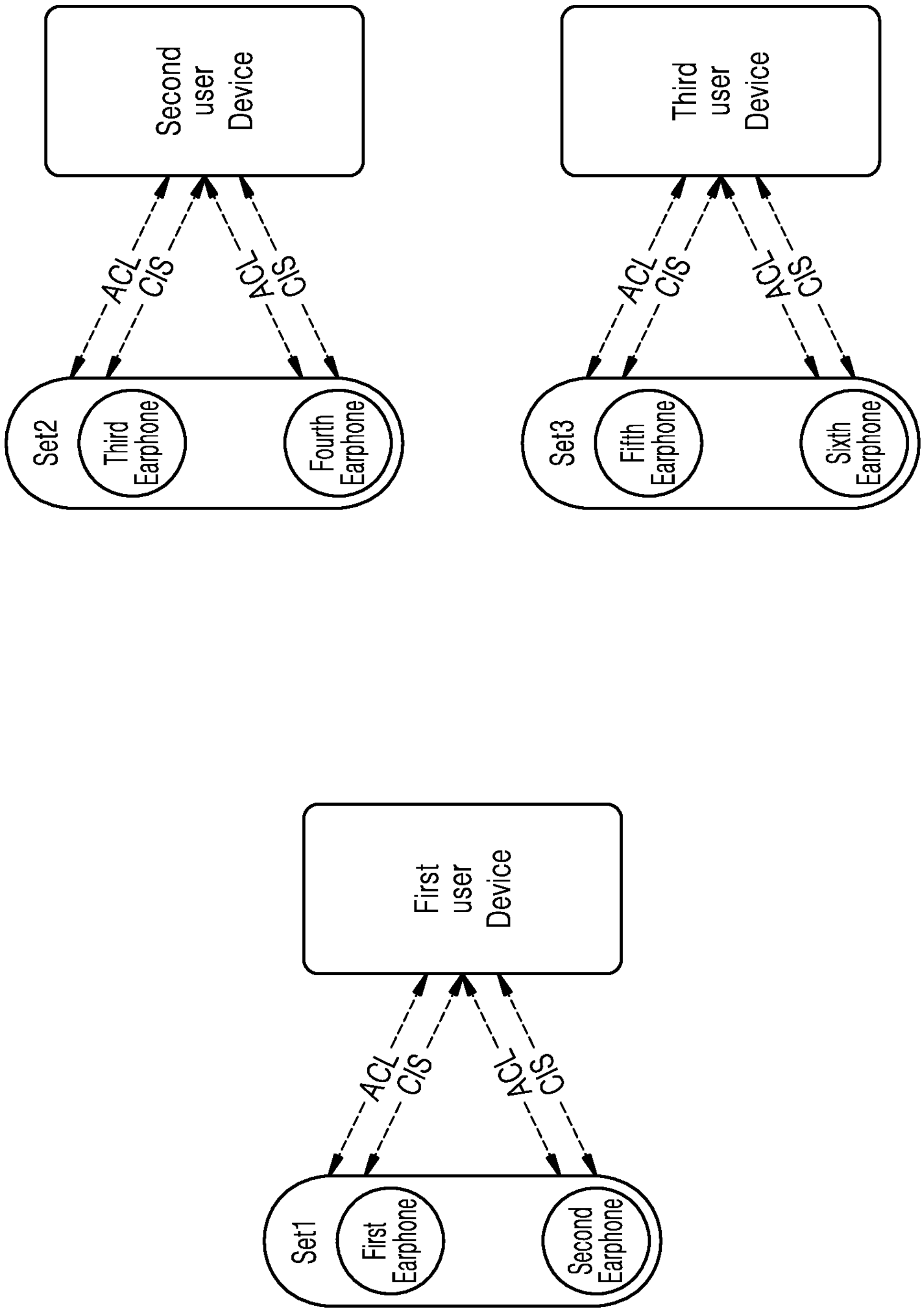

FIG. 8E schematically illustrates restoring of the user device. As shown in FIG. 8E, after the end of audio sharing (e.g., audio sharing has been terminated), the connection unit of the fourth earphone may disconnect the connection with the first user device, the set switch unit of the fourth earphone may remove the set identification Set1 and/or may restore the set identification Set2, and/or the connection unit of the fourth earphone may restore the connection with the second user device. In an embodiment, the respective connection units of the fifth and sixth earphones may disconnect the connections with the first user device, the respective switch units of the fifth and sixth earphones may remove the set identification Set1 and/or restore the set identification Set3, and/or the respective connection units of the fifth and sixth earphones may restore the connection with the third user device.

According to another exemplary embodiment of the present disclosure, there is provided an audio sharing system, including the first user device, the second user device and the audio playing device as described with reference to FIGS. 1 to 8E.

According to another exemplary embodiment of the present disclosure, there is provided an electronic device, including a memory on which computer executable instructions are stored and a processor executing the methods described with reference to FIGS. 1 to 4, when the instructions are executed by the processor.

According to another exemplary embodiment of the present disclosure, there is provided a computer-readable medium on which computer executable instructions are stored and executing the methods described with reference to FIGS. 1 to 4, when the instructions are executed.

According to an exemplary embodiment of the present disclosure, by advertising, scanning, configuring, switching and restoring a set identification, a plurality of audio playing devices may be switched efficiently and flexibly among user devices as audio sources. Moreover, since an audio may be shared with a single audio playing device of a plurality of audio playing devices through another user device, a plurality of audio links may be shared with a plurality of users with a relatively small overhead when compared to related audio playing devices. Consequently, audio reception may be maintained with a previously connected user device through an audio playing device of a plurality of audio playing devices that may not be connected with the another user device. Alternatively or additionally, after terminating the audio sharing, the audio playing device may automatically restore the connection with the previous user device without excessive operations of the user, and thus, may improve user convenience and may enhance user experience.

According to an exemplary embodiment of the present disclosure, there is provided a computer readable storage medium storing instructions that, when executed by at least one processor, cause the at least one processor to execute the method of wirelessly sharing an audio, according to an exemplary embodiment of the present disclosure. The computer readable storage medium may include, but not be limited to, read-only memory (ROM), programmable ROM (PROM), electrically erasable PROM (EEPROM), random access memory (RAM), dynamic RAM (DRAM), static RAM (SRAM), flash, non-volatile memory (NVM), compactable disk ROM (CD-ROM), compact disc-recordable (CD-R or CD+R), compact disc-rewritable (CD-RW or CD+RW), digital versatile disc ROM (DVD-ROM), digital versatile disc-recordable (DVD-R or DVD+R), digital versatile disc-rewritable (DVD-RW or DVD+RW), digital versatile disc RAM (DVD-RAM), Blu-ray disc ROM (BD-ROM), Blu-ray disc-recordable (BD-R), BD-R Low-to-High (BD-R LTH), Blu-ray disc recordable (BD-RE), Blu-ray or optical disc storage, hard disk drive (HDD), solid state drive (SSD), card storage (such as, but not limited to, multimedia cards, secure digital (SD) cards or extreme digital (XD) cards), magnetic tapes, floppy disks, magneto-optical data storage devices, optical data storage devices, hard disks, solid state disks, and the like. The computer readable storage medium may be configured to store a computer program and any relevant data, data files and data structures in a non-transitory manner and to provide the computer program and any relevant data, data files and data structures to the processor or computer, so that the processor or computer may execute the computer program. The computer program stored in the above computer readable storage medium may run in an environment deployed in computer devices such as a client, a host, an agent device and a server. Alternatively or additionally, the computer program and any relevant data, data files and data structures may be distributed over networked computer systems, so that the computer program and any relevant data, data files and data structures are stored, accessed and executed in a distributed manner by one or more processors or computers.

Although the present disclosure has been illustrated and described with reference to specific exemplary embodiments, it is to be understood by those skilled in the art that various changes in form and details may be made without departing from the spirit and scope of the present disclosure as defined by the claims and the equivalents thereof.

What is claimed is:

1. A method of audio sharing to be performed by a first user device, the method comprising:

setting, by the first user device, a predetermined set identification to a first audio playing device of a plurality of audio playing devices, the first user device having established a first short-range wireless connection with the first audio playing device;

advertising, by the first user device, an audio sharing message comprising the predetermined set identification, based on an indication from a user to share an audio content;

receiving, by the first user device from a second audio playing device of the plurality of audio playing devices, an audio sharing confirmation message comprising the predetermined set identification and indicating that the second audio playing device has switched from an original set identification to the predetermined set identification based on the audio sharing message, the second audio playing device having been instructed to switch to the predetermined set identification through a second short-range wireless connection established with a second user device, and the second audio playing device being at least one audio playing device of the second user device;

establishing, by the first user device, a third short-range wireless connection with the second audio playing device; and sending, by the first user device, an audio data packet of the audio content to the first audio playing device, using the first short-range wireless connection, and the second audio playing device, using the third short-range wireless connection.

2. The method of claim 1, further comprising:

sending, by the first user device to the first audio playing device, based on the indication from the user to share the audio content, a set identification switch message instructing the first audio playing device to switch from the original set identification to the predetermined set identification.

3. The method of claim 2, further comprising:

sending, by the first user device to the first audio playing device, based on another indication from the user to terminate the sharing of the audio content, a set identification restore message instructing the first audio playing device to restore the original set identification.

4. The method of claim 3, further comprising:

disconnecting, by the first user device, based on the another indication from the user to terminate the sharing of the audio content, the third short-range wireless connection with the second audio playing device.

5. The method of claim 1, wherein the establishing of the third short-range wireless connection comprises:

establishing at least one Bluetooth Connected Isochronous Stream (CIS) connection.

6. The method of claim 1, wherein the receiving the audio sharing confirmation message comprises:

receiving the audio sharing confirmation message within a predetermined period of time.

7. The method of claim 6, wherein the establishing the third short-range wireless connection with the second audio playing device comprises:

establishing the third short-range wireless connection with the second audio playing device after an end of the predetermined period of time.

8. The method of claim 4, wherein the disconnecting the third short-range wireless connection comprises:

disconnecting at least one Bluetooth CIS connection.

9. A method of audio sharing to be performed by a second audio playing device, the method comprising:

receiving, by the second audio playing device from a second user device, an indication instructing the second audio playing device to switch from an original set identification to a predetermined set identification, the indication having been transmitted based on a first indication of a first user to share an audio content of a second user, the second audio playing device being at least one audio playing device of the second user device, the second audio playing device having established a first short-range wireless connection with the second user device;

switching, by the second audio playing device, from the original set identification to the predetermined set identification;

advertising, by the second audio playing device, an audio sharing confirmation message comprising the predetermined set identification;

establishing, by the second audio playing device, a second short-range wireless connection with a first user device, the first user device having established a third short-range wireless connection with a first audio playing device having the predetermined set identification; and receiving, by the second audio playing device from the first user device, an audio data packet of the audio content using the second short-range wireless connection.

10. The method of claim 9, further comprising:

disconnecting, by the second audio playing device, the first short-range wireless connection with the second user device, after the advertising of the audio sharing confirmation message, wherein the disconnecting of the first short-range wireless connection comprises disconnecting at least one Bluetooth Connected Isochronous Stream (CIS) connection.

11. The method of claim 9, further comprising:

disconnecting, by the second audio playing device, the second short-range wireless connection with the first user device, based on a second indication of the first user to terminate the sharing of the audio content.

12. The method of claim 9, further comprising:

based on a second indication of the first user to terminate the sharing of the audio content, restoring the original set identification and sending, to the second user device, a set identification restore message indicating that the second user device has restored the original set identification, wherein the establishing of the third short-range wireless connection comprises establishing at least another Bluetooth Connected Isochronous Stream (CIS) connection.

13. The method of claim 9, wherein the advertising the audio sharing confirmation message comprises:

advertising the audio sharing confirmation message within a predetermined period of time.

14. The method of claim 13, wherein the establishing the second short-range wireless connection with the first user device comprises:

establishing the third short-range wireless connection with the second audio playing device after an end of the predetermined period of time.

15. The method of claim 9, wherein the establishing of the second short-range wireless connection comprises:

establishing at least one Bluetooth CIS connection.

16. An audio sharing system, comprising:

a first user device comprising a first memory storing first instructions, and a first processor communicatively coupled to the first memory;

a second user device comprising a second memory storing second instructions, and a second processor communicatively coupled to the second memory; and a plurality of audio playing devices comprising a first audio playing device and a second audio playing device, wherein the first processor is configured to execute the first instructions to:

set a predetermined set identification to the first audio playing device, the first user device having established a first short-range wireless connection with the first audio playing device;

advertise an audio sharing message comprising the predetermined set identification, based on an indication from a first user to share an audio content;

receive, from the second audio playing device, an audio sharing confirmation message comprising the predetermined set identification and indicating that the second audio playing device has switched from an original set identification to the predetermined set identification based on the audio sharing message, the second audio playing device having been instructed to switch to the predetermined set identification through a second short-range wireless connection established with the second user device, the second audio playing device being at least one audio playing device of the second user device;

establish a third short-range wireless connection with the second audio playing device; and send an audio data packet of the audio content to the first audio playing device, using the first short-range wireless connection, and the second audio playing device, using the third short-range wireless connection.

17. The audio sharing system of claim 16, wherein the second processor is configured to execute the second instructions to:

receive, from the first user device, the audio sharing message comprising the predetermined set identification, the audio sharing message having been advertised by the first user device, based on the indication from the first user to share the audio content; and instruct the second audio playing device to switch from the original set identification to the predetermined set identification, causing the second audio playing device to advertise, after switching to the predetermined set identification, the audio sharing confirmation message comprising the predetermined set identification, and to receive, from the first user device using the first short-range wireless connection, the audio data packet of the audio content, and the second user device having established the second short-range wireless connection with the second audio playing device.

18. The audio sharing system of claim 17, wherein an audio playing device of the plurality of audio playing devices is configured to:

receive, from the second user device, an indication instructing the audio playing device to switch from the original set identification of the audio playing device to the predetermined set identification, the audio playing device having established the first short-range wireless connection with the second user device;

switch from the original set identification of the audio playing device to the predetermined set identification;

advertise the audio sharing confirmation message comprising the predetermined set identification;

establish the second short-range wireless connection with the first user device; and receive, from the first user device, the audio data packet using the second short-range wireless connection.

19. The audio sharing system of claim 16, wherein the first processor is further configured to execute the first instructions to:

send, to the first audio playing device, based on the indication from a user to share the audio content, a set identification switch message instructing the first audio playing device to switch from the original set identification to the predetermined set identification.

20. The audio sharing system of claim 19, wherein the first processor is further configured to execute the first instructions to:

send, to the first audio playing device, based on another indication from the user to terminate the sharing of the audio content, a set identification restore message instructing the first audio playing device to restore the original set identification.

* * * * *